United States Patent [19]

Antrim

[11] 4,068,749
[45] Jan. 17, 1978

[54] CLUTCH PLATE AND DAMPER ASSEMBLY
[75] Inventor: Warren W. Antrim, Dayton, Ohio
[73] Assignee: General Motors Corporation, Detroit, Mich.
[21] Appl. No.: 694,210
[22] Filed: June 9, 1976
[51] Int. Cl.² .............................................. F16D 3/14
[52] U.S. Cl. ................. 192/106.1; 64/27 CS
[58] Field of Search .......................... 192/106.2, 106.1; 64/27 CS, 27 F, 29

[56]  References Cited
U.S. PATENT DOCUMENTS

| 2,221,823 | 11/1940 | Thelander | 192/106.2 X |
| 3,327,820 | 6/1967 | Maurice | 192/106.2 X |
| 3,811,545 | 5/1974 | Sato et al. | 192/106.1 |

FOREIGN PATENT DOCUMENTS

| 46-14761 | 12/1966 | Japan | 192/106.2 |
| 1,235,699 | 6/1971 | United Kingdom | 192/106.2 |

Primary Examiner—Benjamin W. Wyche
Attorney, Agent, or Firm—Donald F. Scherer

[57] ABSTRACT

A clutch assembly comprised of a pressure plate, a hub, a retainer and a friction facing. The friction facing is secured to the pressure plate. The hub is disposed between the pressure plate and the retainer which is secured to the pressure plate by fasteners. Surface deformations are formed in the hub and the retainer. The surface deformations, such as indentations and projections, cooperate to provide friction damping and establish a spring force between the retainer and the hub. The circumferential excursion of the hub is fixed by the relative dimensions of the projections and indentations and the ramp shape of the indentations determines the rate of resistance. Increased friction damping can be provided by the addition of friction material to the surface of the retainer adjacent the hub. The inner diameter of the hub is splined for connection with a drive shaft.

3 Claims, 8 Drawing Figures

CLUTCH PLATE AND DAMPER ASSEMBLY

This invention relates to clutch assemblies and more particularly to clutch assemblies having vibration dampers to isolate engine torsional vibrations.

Prior art clutch assemblies having integral dampers are manufactured from a plurality of complements which generally include a clutch plate, a hub, a plurality of coil springs, and a plurality of dampener friction discs. These components are generally constructed in the manner shown in U.S. Pat. No. 3,327,820 issued to Maurice June 27, 1967. These devices, while generally providing the desired torque transmission and vibration dampening, do have some shortcomings. They are comprised of a multiplicity of parts; they permit only limited angular excursion between the input and output members of the clutch and the loading and dampening are inherently equal in both directions of rotation, unless more complex and sophisticated methods are used to overcome this.

The present invention overcomes these shortcomings as providing a clutch assembly made from as few as four components namely: a hub, pressure plate, retainer and friction facing. The hub and retainer cooperate, through projections and indentations formed thereon to provide the desired friction dampening characteristic and the spring loading characteristic which is needed. The circumferential excursion of the hub is controlled by the relative dimensions of the projections and indentations. The ramp shape of the indentation determines the rate of resistance to circumferential excursion and may be different in the two directions of relative rotation. The necessary spring loading force is provided by the ramp shape of the indentation and the axial spring characteristic which is inherent in the spring retainer which is similar to a belleville spring. Damping of the torsional vibration energy is provided by the friction between the retainer and hub, which damping can be controlled by tightening the axial fit and/or by providing a friction material facing on one of the interfaces between the retainer and hub.

It is therefore an object of this invention to provide an improved clutch plate and damper assembly formed with a minimum number of components wherein two of the components actuate to provide friction damping and spring loading.

It is another object of this invention to provide an improved clutch plate and damper assembly comprised of a pressure plate having a friction facing thereon, a hub member adapted to be connected to an output shaft and a retainer secured to the pressure plate and mating with the hub through a plurality of protuberances and indentations which cooperate to provide the friction dampening and spring loading characteristics of the damper.

These and other objects and advantages of the present invention will be more apparent from the following description and drawings in which.

Figure 1:
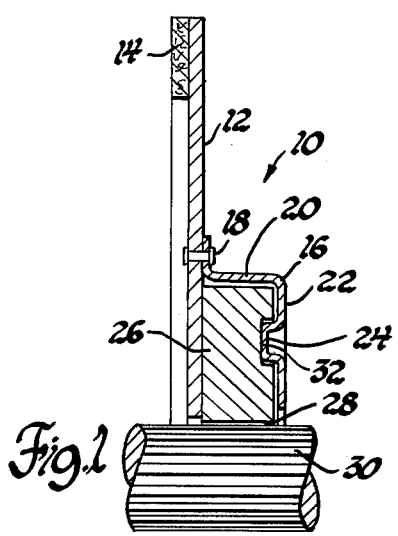
FIG. 1 is a cross sectional view of a clutch assembly incorporating the invention.

Referring to the drawings wherein like characters represent the same or corresponding parts there is shown in FIG. 1 a clutch 10 having an annular pressure plate 12 to which is bonded or otherwise secured an annular friction facing 14. A retainer member 16 is riveted or otherwise fastened to the pressure plate 12 by a plurality of fasteners 18. The retainer 16 is generally cup shaped having a circumferential wall 20 and an annular wall 22 which is spaced from the pressure plate 12 as seen in FIG. 1. The annular wall 22 has formed therein one or more surface deformations, such as protuberances or projections 24.

An annular hub member 26 is disposed between the pressure plate 12 and the retainer 16. The hub 26 has a splined internal diameter 28 which permits a driving connection between the hub 26 and a transmission shaft 30. The hub 26 has formed therein one or more surface deformations, such as indentations 32 which mate with the protuberances 24 formed on the annular wall 22 of retainer 16.

Figure 2:
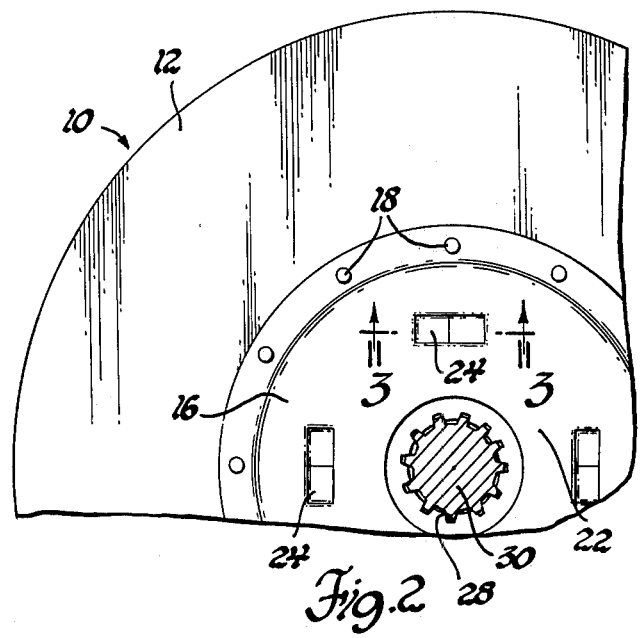
FIG. 2 is a partial elevational view of the clutch plate shown in FIG. 1.

The clutch 10 shown in FIGS. 1 and 2 is preferably designed to operate in a torque converter and clutch arrangement such as that shown in U.S. Pat. No. 3,730,315 Annis et al. issued May 1, 1973. The clutch 10 however is designed to be a full lock-up clutch rather than a slipping clutch such as that shown in Annis et al.

Figure 3:
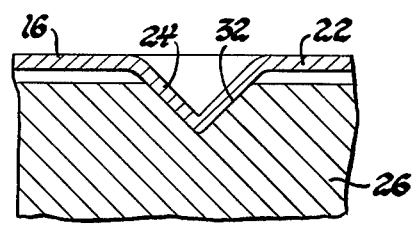
FIG. 3 is an enlarged sectional view taken along line 3—3 of FIG. 2.

The structure of the protuberance 24 and indentation 32 are shown in FIG. 3. As seen in FIG. 3 the protuberance 24 is generally V-shaped and mates with a matching V-shaped indentation formed in the hub 26. When the clutch is in operation, as is well known, engine torsional vibrations must be dampened to prevent the transmission thereof to the drive shaft 30 of the clutch. To absorb and dissipate these torsional vibrations, the retainer 16 and hub 26 are permitted to have limited annular movement therebetween such that the protuberance 24 will move on the ramps formed with indentation 32. The physical contact between protuberance 24 and indentation 32 provides the friction damping which dissipates the torsional energy and also movement along the ramp causing an increase in the inherent spring load of retainer 16. It should be obvious to one skilled in the art that the annular end wall 22 of the retainer 16 has the characteristics of a belleville spring. It should also be noted that, since the backside of hub 26 is in abutting relationship with pressure plate, there will also be some friction forces between these two members. If it is desirable to limit the friction between these surfaces, an anti-friction composition can be bonded to either or both of the hub 26 and pressure plate 12.

The protuberances 24 and indentations 32, as shown in FIG. 3, will provide substantially the same friction damping and spring loading characteristics in both directions of circumferential excursion. This of course can be modified by providing different ramp angles on the sides of indentation 32. It should also be appreciated that the indentations can be formed in the retainer 16 and the protuberances can be formed on the hub 32 without affecting the damping charcteristics provided thereby.

FIGS. 4 through 8 disclose various indentation and protuberance configurations which can be utilized to affect the amount of damping, spring loading and circumferential excursion desired in the clutch system.

Figure 4:
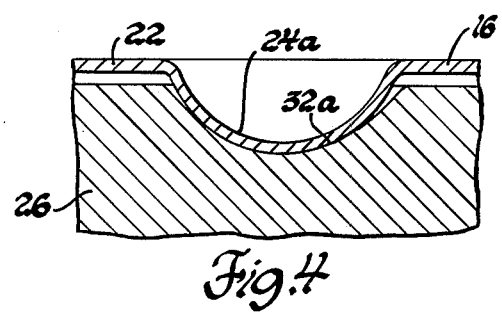
FIGS. 4–8 are modifications of the structure shown in FIG. 3.

FIG. 4 for example has a substantially semi spherical protuberance 24a mating with a corresponding indentation 32a. As can be seen in FIG. 4 the indentation 32a does not have a constant radius therefore the damping characteristic will be different depending on the direction of circumferential excursion.

Figure 5:
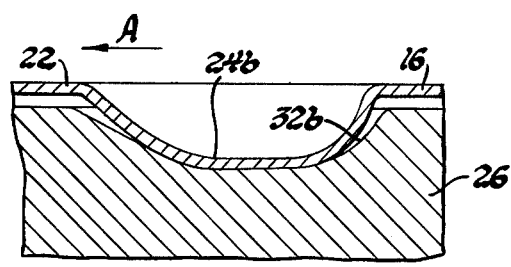

In FIG. 5, the protuberance 24b and indentation 32b permit extended engagement therebetween in the direction of arrow A such that the friction characteristic and spring loading characteristic will develop quite slowly in that direction while in the opposite direction the characteristics would be similar to that shown in FIG. 4.

Figure 6:
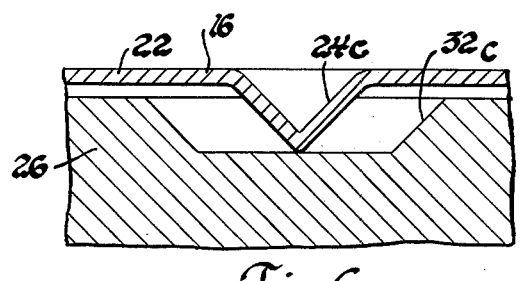

The arrangement shown in FIG. 6, wherein the protuberance 24c is V-shaped and the indentation 32c has angled ramp sides and a flat portion therebetween, permits extended excursion at a substantially constant friction force and spring load until the protuberances 24c abuts one or the other of the ramps of 32c, after which abutting action the friction damping and spring loading characteristics will increase.

Figure 7:
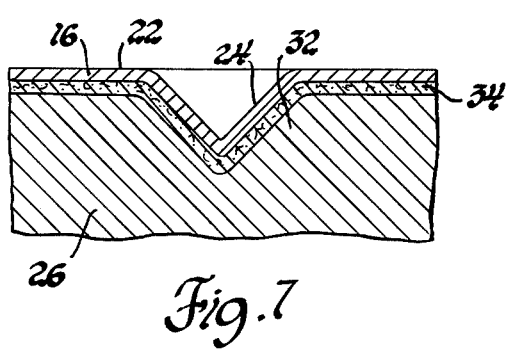

The arrangement shown in FIG. 7 is identical to that shown in FIG. 3 with the exception that a friction material 34 has been bonded to the protuberance 24 and annular wall 22 of the retainer 16. With this arrangement increased friction damping can be obtained while the inherent spring forces are maintained. It should also be apparent that the friction material can also be added in like manner to the configurations shown in FIGS. 4, 5, 6 and 8.

Figure 8:
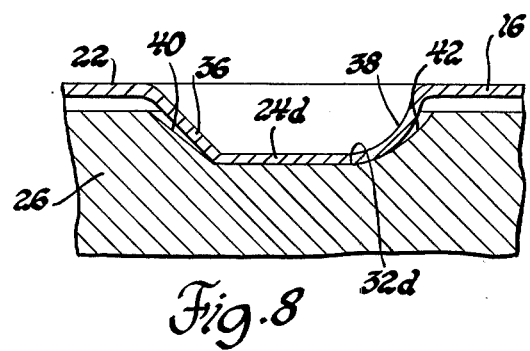

The arrangement shown in FIG. 8 includes a protuberance 24d which has an angle ramp 36 at one end thereof and a circular cross section ramp 38 at the other end thereof. The indentation 32d correspondingly has an angular ramp 40 cooperating with the ramp 36 and a substantially semi circular ramp 42 cooperating with the ramp 38. It should be obvious to those skilled in the art that upon viewing this arrangement they will recognize this arrangement that the friction and spring loading characteristics will be different depending on the direction of excursion.

The number of protuberances and indentations is selected to provide the desired damping characteristic which of course is dependent on the drive system and the torsional vibrations which will be developed within the system. The initial spring loading of the retainer 16 can be controlled by the depth of the circumferential wall 20 such that more or less spring loading is available at assembly. This spring loading can also be controlled by controlling the width of hub 26 while maintaining a constant depth of the wall 20 for various clutch arrangements.

Obviously, many modifications and variations are possible in light of the above teaching. It is, therefore, to be understood that within the scope of the appended claims the invention may be practiced otherwise than is specifically described.

What is claimed is:

1. A clutch plate and damper assembly for use in a drive system having an engine and a drive shaft comprising; a pressure plate; an annular friction facing secured to said pressure plate adjacent the outer periphery thereof adapted to be driven by said engine; a retainer member secured to said pressure plate intermediate the center and outer periphery thereof, said retainer having an annular wall portion spaced from said pressure plate, and at least one protuberance formed in said annular wall; and a hub member disposed between said pressure plate and said retainer, said hub member having an indentation complementary to said protuberance, and a portion having drive means thereon for connection with said drive shaft; said annular wall of said retainer having resilient properties and being operable to maintain the only resilient drive connection between said pressure plate and said hub means, and said protuberance and surface deformation cooperating to provide a friction connection between said pressure plate and said hub means in response to the resilient properties of said annular wall to permit relative angular motion between said pressure plate and said hub member controlled by the resilient properties and the friction connection whereby torsional vibrations of the engine are isolated from th drive shaft.

2. A clutch plate and damper assembly for use in a drive system having an engine and a drive shaft comprising; a pressure plate; an annular friction facing secured to said pressure plate adjacent the outer periphery thereof adapted to be driven by said engine; a retainer member secured to said pressure plate intermediate the center and outer periphery thereof, said retainer having a circumferential portion secured to said pressure plate and an annular wall portion integral with said circumferential portion; spaced from said pressure plate and having resilient properties; a hub member disposed between said pressure plate and said retainer said hub member having a portion having drive means thereon for connection with said drive shaft; and at least one protuberance formed on either said annular wall or said hub member and a surface deformation on the other of said hub member or annular wall; said annular wall of said retainer maintaining the only resilient drive connection between said pressure plate and said hub means, and said protuberance and surface deformation cooperating to provide a friction connection between said pressure plate and said hub means in response to the resilient properties of said annular wall to permit relative angular motion between said pressure plate and said hub member controlled by the resilient properties and the friction connection whereby torsional vibrations of the engine are isolated from the drive shaft.

3. A clutch plate and damper assembly for use in a drive system having an engine and a drive shaft comprising; a pressure plate; an annular friction facing secured to said pressure plate adjacent the outer periphery thereof adapted to be driven by said engine; a retainer member secured to said pressure plate intermediate the center and outer periphery thereof, said retainer having an annular wall portion having the resilient properties of a belleville spring and being spaced from said pressure plate, and at least one surface deformation formed in said annular wall; a hub member disposed between said pressure plate and said retainer, said hub member having a surface deformation complementary to said surface deformation in said annular wall and a portion having drive means thereon for connection with said drive shaft; and a friction material secured to said annuar wall or said hub member at the interface therebetween and covering the respective surface deformation; said annular wall of said retainer maintaining the only resilient drive connection between said pressure plate and said hub means, said friction material and surface deformation in each said annular wall and said hub member cooperating to provide a friction drive connection therebetween in response to the resilient properties of said annular wall to permit relative angular motion between said pressure plate and said hub member controlled by the resilient properties and the friction connection whereby torsional vibrations of the engine are isolated from the drive shaft.

* * * * *